United States Patent
Na et al.

(10) Patent No.: US 12,303,790 B2
(45) Date of Patent: May 20, 2025

(54) GENERATING ADDITIONAL CONTENT ITEMS FOR PARALLEL-REALITY GAMES BASED ON GEO-LOCATION AND USAGE CHARACTERISTICS

(71) Applicant: Niantic, Inc., San Francisco, CA (US)

(72) Inventors: Piaw Na, Los Altos, CA (US); Jia Huang, Berkley, CA (US); Hang Tan, San Francisco, CA (US); Steve Zelinka, Bellevue, WA (US); Herbert Law, San Jose, CA (US)

(73) Assignee: Niantic, Inc., San Francisco, CA (US)

( * ) Notice: Subject to any disclaimer, the term of this patent is extended or adjusted under 35 U.S.C. 154(b) by 316 days.

(21) Appl. No.: 17/957,153

(22) Filed: Sep. 30, 2022

(65) Prior Publication Data

US 2024/0108989 A1    Apr. 4, 2024

(51) Int. Cl.
*A63F 13/79* (2014.01)
*A63F 13/216* (2014.01)
*A63F 13/44* (2014.01)
*A63F 13/65* (2014.01)

(52) U.S. Cl.
CPC ............ *A63F 13/79* (2014.09); *A63F 13/216* (2014.09); *A63F 13/44* (2014.09); *A63F 13/65* (2014.09); *A63F 2300/8082* (2013.01)

(58) Field of Classification Search
CPC ........ A63F 13/79; A63F 13/216; A63F 13/44; A63F 13/65; A63F 2300/8082
See application file for complete search history.

(56) References Cited

U.S. PATENT DOCUMENTS

| | | | | |
|---|---|---|---|---|
| 2001/0034643 A1* | 10/2001 | Acres | ...................... | A63F 13/12 705/14.66 |
| 2003/0190940 A1* | 10/2003 | Gordon | ................... | A63F 13/52 463/9 |
| 2004/0148221 A1* | 7/2004 | Chu | ................... | G06Q 30/0253 705/14.51 |
| 2004/0255032 A1* | 12/2004 | Danieli | ................. | A63F 13/335 709/205 |
| 2005/0059491 A1* | 3/2005 | Oh | ...................... | G07F 17/3276 463/42 |
| 2006/0014585 A1* | 1/2006 | Neogi | ..................... | A63F 13/12 463/42 |
| 2009/0149248 A1* | 6/2009 | Busey | ..................... | A63F 13/12 463/43 |

(Continued)

*Primary Examiner* — Steve Rowland
(74) *Attorney, Agent, or Firm* — Fenwick & West LLP

(57) ABSTRACT

A game server generates a parallel-reality game that users may interact with in the real-world. The game server receives user information as users interact with game content. The game server includes a content marketplace that manages the exchange value of additional content items. The content marketplace matches additional game content with users playing the game based on the exchange value of the additional content items and user information. To do so, the content marketplace determines a propensity score for each additional content item quantifying a likelihood the user will interact with the additional content item while interacting with content in the parallel-reality game. The content marketplace provides the additional content item to the user's client device for display in the parallel-reality game based on the propensity score.

18 Claims, 6 Drawing Sheets

(56) References Cited

U.S. PATENT DOCUMENTS

| | | | |
|---|---|---|---|
| 2009/0191971 A1* | 7/2009 | Avent | A63F 13/335 463/41 |
| 2009/0298585 A1* | 12/2009 | Cannon | A63F 13/26 463/31 |
| 2010/0056236 A1* | 3/2010 | Rhyne, IV | A63F 13/00 463/1 |
| 2010/0227669 A1* | 9/2010 | Van Luchene | A63F 13/85 463/23 |
| 2010/0255894 A1* | 10/2010 | Kidakarn | A63F 13/843 463/2 |
| 2011/0092282 A1* | 4/2011 | Gary | A63F 13/837 463/31 |
| 2011/0118033 A1* | 5/2011 | Fiedler | A63F 13/822 463/43 |
| 2011/0190062 A1* | 8/2011 | Lee | A63F 13/49 463/43 |
| 2011/0258049 A1* | 10/2011 | Ramer | G06Q 30/0273 705/14.69 |
| 2013/0203499 A1* | 8/2013 | Oh | A63F 13/79 463/43 |
| 2021/0342886 A1* | 11/2021 | O'Hanlon | G06V 40/172 |

* cited by examiner

GENERATING ADDITIONAL CONTENT ITEMS FOR PARALLEL-REALITY GAMES BASED ON GEO-LOCATION AND USAGE CHARACTERISTICS

BACKGROUND

1. Technical Field

The subject matter described relates generally to generating and placing parallel-reality game content in a parallel-reality world, and in particular to matching additional parallel-reality game content for placement into a user's game experience based on real-time location information and user characteristics.

2. Problem

Traditional applications can include geo-matched content items that are based on a general location of the user, such as a continent, country, or state in which the user resides. A server can determine the geolocation of a user device (e.g., via its IP address), access virtual content associated with the geolocation, and provide the client device with virtual content linked to that geolocation. For example, a user in Europe may receive different virtual content than a user in Japan. However, the process of providing relevant content based on geolocation for a parallel-reality application is far more complex problem. For instance, it is desirable to select and configure additional content items in a dynamic manner for presentation as parallel-reality application content configured for near seamless display in a parallel-reality world due to the variability in how users may interact with the real-world when using the parallel-reality application. As such, there is a need for a techniques to match and place content items in a parallel-reality world based on the geo-location and usage characteristics of client devices executing parallel reality applications.

SUMMARY

A system creates and maintains a virtual world that parallels the real-world. Users employ a client device to interact with content in the virtual world. For instance, a user may interact with their client device to use a parallel-reality application (e.g., a game) that exists within the parallel world as they move about in the real world. Various content in the parallel-reality application may be based on user characteristics such as their real-world location, usage characteristics, parallel-world location, etc.

In some configurations, the system may also maintain a geo-based content placement system that identifies additional content items to provide to users using an online parallel-reality application based on one or more of the user's real-world location information, the user's usage characteristics, and the additional content item(s). In this case, the geo-based content placement system may receive pertinent information about the additional content and pertinent information about users using the parallel reality application. The system then matches users to additional content based on that information. To do so, for example, the geo-based content placement system may calculate a propensity score quantifying a degree of overlap between a user and additional content based on received information. The system may then match additional content to users having a sufficient propensity score and place the additional content in the parallel reality world for them to experience.

To illustrate, in one embodiment, this includes a computer-implemented method for providing location-based interactions in a parallel-reality application. The method receives, from a client device, real-time location information and usage characteristics describing a user interacting with content in the parallel-reality application. The method accesses a ranked list of additional content items for the parallel-reality application to provide to users interacting with content in the parallel-reality game. The method determines, for each additional content item in the ranked list, a propensity score. The propensity score quantifies a degree of overlap between real-time location information and usage characteristics describing the user and assigned properties for the additional content item. The propensity score is based on the real-world location information, usage characteristics describing the user, and the assigned properties of the additional content item. The method provides the additional content item with a highest propensity score to the client device for display in the parallel-reality application. The method may provide the additional content item responsive to determining the propensity score.

The figures and the following description describe certain embodiments by way of illustration only. One skilled in the art will readily recognize from the following description that alternative embodiments of the structures and methods may be employed without departing from the principles described. Wherever practicable, similar or like reference numbers are used in the figures to indicate similar or like functionality. Where elements share a common numeral followed by a different letter, this indicates the elements are similar or identical. A reference to the numeral alone generally refers to any one or any combination of such elements, unless the context indicates otherwise.

DETAILED DESCRIPTION

I. Example Location-Based Parallel-Reality Game

Figure 1:
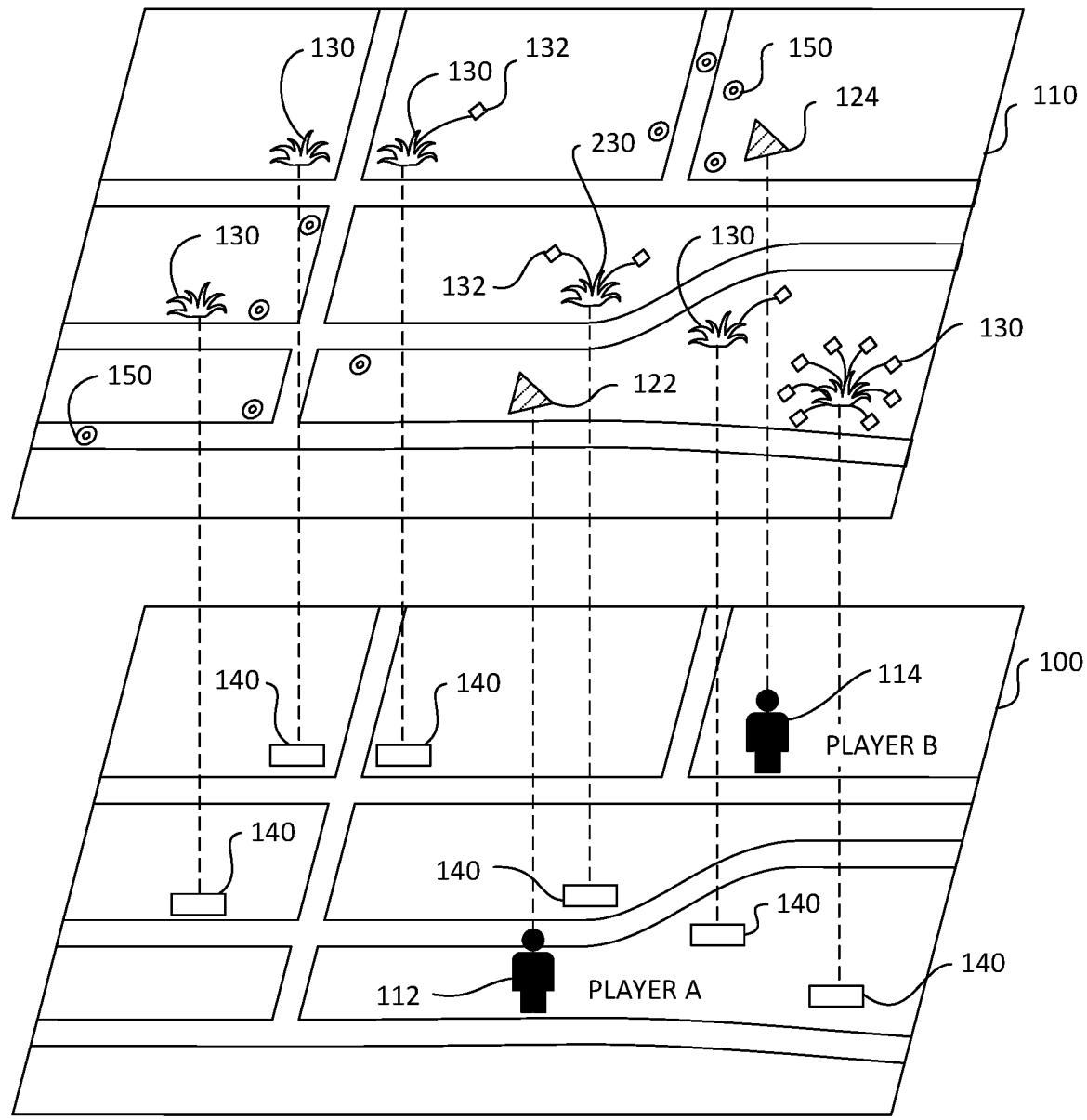
FIG. 1 is a conceptual diagram of a virtual world that parallels the real world, according to one example embodiment.

FIG. 1 is a conceptual diagram of a virtual world 110 that parallels the real world 100. The virtual world 110 can act as the game board for players of a parallel-reality game. As illustrated, the virtual world 110 includes a geography that parallels the geography of the real world 100. In particular, a range of coordinates defining a geographic area or space in the real world 100 is mapped to a corresponding range of coordinates defining a virtual space in the virtual world 110.

The range of coordinates in the real world 100 can be associated with a town, neighborhood, city, campus, locale, a country, continent, the entire globe, or other geographic area. Each geographic coordinate in the range of geographic coordinates is mapped to a corresponding coordinate in a virtual space in the virtual world 110.

A player's position in the virtual world 110 corresponds to the player's position in the real world 100. For instance, player A located at position 112 in the real world 100 has a corresponding position 122 in the virtual world 110. Similarly, player B located at position 114 in the real world 100 has a corresponding position 124 in the virtual world 110. As the players move about in a range of geographic coordinates in the real world 100, the players also move about in the range of coordinates defining the virtual space in the virtual world 110. In particular, a positioning system (e.g., a GPS system, a localization system, or both) associated with a mobile computing device carried by the player can be used to track a player's position as the player navigates the range of geographic coordinates in the real world 100. Data associated with the player's position in the real world 100 is used to update the player's position in the corresponding range of coordinates defining the virtual space in the virtual world 110. In this manner, players can navigate along a continuous track in the range of coordinates defining the virtual space in the virtual world 110 by simply traveling among the corresponding range of geographic coordinates in the real world 100 without having to check in or periodically update location information at specific discrete locations in the real world 100.

The location-based game can include game objectives requiring players to travel to or interact with various virtual elements or virtual objects scattered at various virtual locations in the virtual world 110. A player can travel to these virtual locations by traveling to the corresponding location of the virtual elements or objects in the real world 100. For instance, a positioning system can track the position of the player such that as the player navigates the real world 100, the player also navigates the parallel virtual world 110. The player can then interact with various virtual elements and objects at the specific location to achieve or perform one or more game objectives.

A game objective may have players interacting with virtual elements 130 located at various virtual locations in the virtual world 110. These virtual elements 130 can be linked to landmarks, geographic locations, or objects 140 in the real world 100. The real-world landmarks or objects 140 can be works of art, monuments, buildings, businesses, libraries, museums, or other suitable real-world landmarks or objects. Interactions include capturing, claiming ownership of, using some virtual item, spending some virtual currency, etc. To capture these virtual elements 130, a player travels to the landmark or geographic locations 140 linked to the virtual elements 130 in the real world and performs any necessary interactions (as defined by the game's rules) with the virtual elements 130 in the virtual world 110. For example, player A 112 may have to travel to a landmark 140 in the real world 100 to interact with or capture a virtual element 130 linked with that particular landmark 140. The interaction with the virtual element 130 can require action in the real world, such as taking a photograph or verifying, obtaining, or capturing other information about the landmark or object 140 associated with the virtual element 130.

Game objectives may require that players use one or more virtual items that are collected by the players in the location-based game. For instance, the players may travel the virtual world 110 seeking virtual items 132 (e.g. weapons, creatures, power ups, or other items) that can be useful for completing game objectives. These virtual items 132 can be found or collected by traveling to different locations in the real world 100 or by completing various actions in either the virtual world 110 or the real world 100 (such as interacting with virtual elements 130, battling non-player characters or other players, or completing quests, etc.). In the example shown in FIG. 1, a player uses virtual items 132 to capture one or more virtual elements 130. In particular, a player can deploy virtual items 132 at locations in the virtual world 110 near to or within the virtual elements 130. Deploying one or more virtual items 132 in this manner can result in the capture of the virtual element 130 for the player or for the team/faction of the player.

In one particular implementation, a player may have to gather virtual energy as part of the parallel-reality game. Virtual energy 150 can be scattered at different locations in the virtual world 110. A player can collect the virtual energy 150 by traveling to (or within a threshold distance of) the location in the real world 100 that corresponds to the location of the virtual energy in the virtual world 110. The virtual energy 150 can be used to power virtual items or perform various game objectives in the game. A player that loses all virtual energy 150 may be disconnected from the game or prevented from playing for a certain amount of time or until they have collected additional virtual energy 150.

According to aspects of the present disclosure, the parallel-reality game can be a massive multi-player location-based game where every participant in the game shares the same virtual world. The players can be divided into separate teams or factions and can work together to achieve one or more game objectives, such as to capture or claim ownership of a virtual element. In this manner, the parallel-reality game can intrinsically be a social game that encourages cooperation among players within the game. Players from opposing teams can work against each other (or sometime collaborate to achieve mutual objectives) during the parallel-reality game. A player may use virtual items to attack or impede progress of players on opposing teams. In some cases, players are encouraged to congregate at real world locations for cooperative or interactive events in the parallel-reality game. In these cases, the game server seeks to ensure players are indeed physically present and not spoofing their locations.

Figure 2:
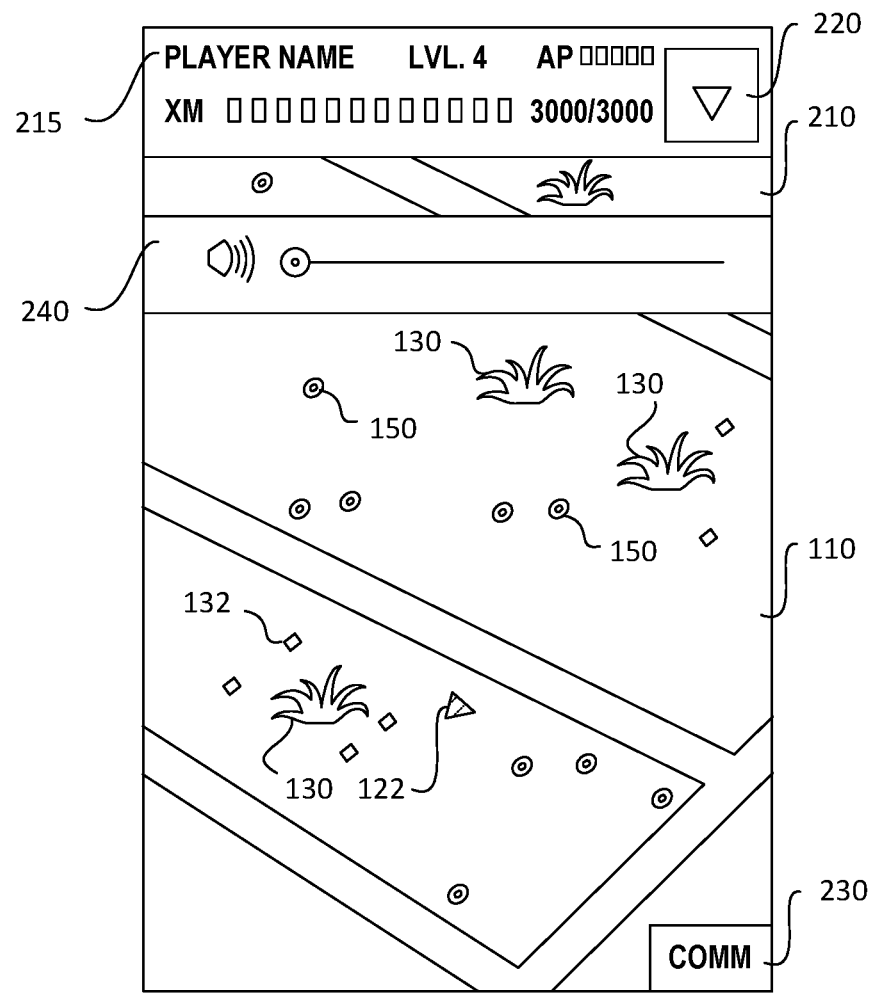
FIG. 2 depicts one embodiment of a game interface that can be presented as part of the interface between the player and the virtual world, according to one example embodiment.

FIG. 2 depicts one embodiment of a game interface 200 that can be presented (e.g., on a player's smartphone) as part of the interface between the player and the virtual world 110. The game interface 200 includes a display window 210 that can be used to display the virtual world 110 and various other aspects of the game, such as player position 122 and the locations of virtual elements 130, virtual items 132, and virtual energy 150 in the virtual world 110. The user interface 200 can also display other information, such as game data information, game communications, player information, client location verification instructions and other information associated with the game. For example, the user interface can display player information 215, such as player name, experience level, and other information. The user interface 200 can include a menu 220 for accessing various game settings and other information associated with the game. The user interface 200 can also include a communications interface 230 that enables communications between the game system and the player and between one or more players of the parallel-reality game.

According to aspects of the present disclosure, a player can interact with the parallel-reality game by carrying a client device 110 around in the real world. For instance, a player can play the game by accessing an application associated with the parallel-reality game on a smartphone and moving about in the real world with the smartphone. In this regard, it is not necessary for the player to continuously view a visual representation of the virtual world on a display screen in order to play the location-based game. As a result, the user interface 200 can include non-visual elements that allow a user to interact with the game. For instance, the game interface can provide audible notifications to the player when the player is approaching a virtual element or object in the game or when an important event happens in the parallel-reality game. In some embodiments, a player can control these audible notifications with audio control 240. Different types of audible notifications can be provided to the user depending on the type of virtual element or event. The audible notification can increase or decrease in frequency or volume depending on a player's proximity to a virtual element or object. Other non-visual notifications and signals can be provided to the user, such as a vibratory notification or other suitable notifications or signals.

The parallel-reality game can have various features to enhance and encourage game play within the parallel-reality game. For instance, players can accumulate a virtual currency or another virtual reward (e.g., virtual tokens, virtual points, virtual material resources, etc.) that can be used throughout the game (e.g., to purchase in-game items, to redeem other items, to craft items, etc.). Players can advance through various levels as the players complete one or more game objectives and gain experience within the game. Players may also be able to obtain enhanced "powers" or virtual items that can be used to complete game objectives within the game.

Those of ordinary skill in the art, using the disclosures provided, will appreciate that numerous game interface configurations and underlying functionalities are possible. The present disclosure is not intended to be limited to any one particular configuration unless it is explicitly stated to the contrary.

II. Example Gaming System

Figure 3:
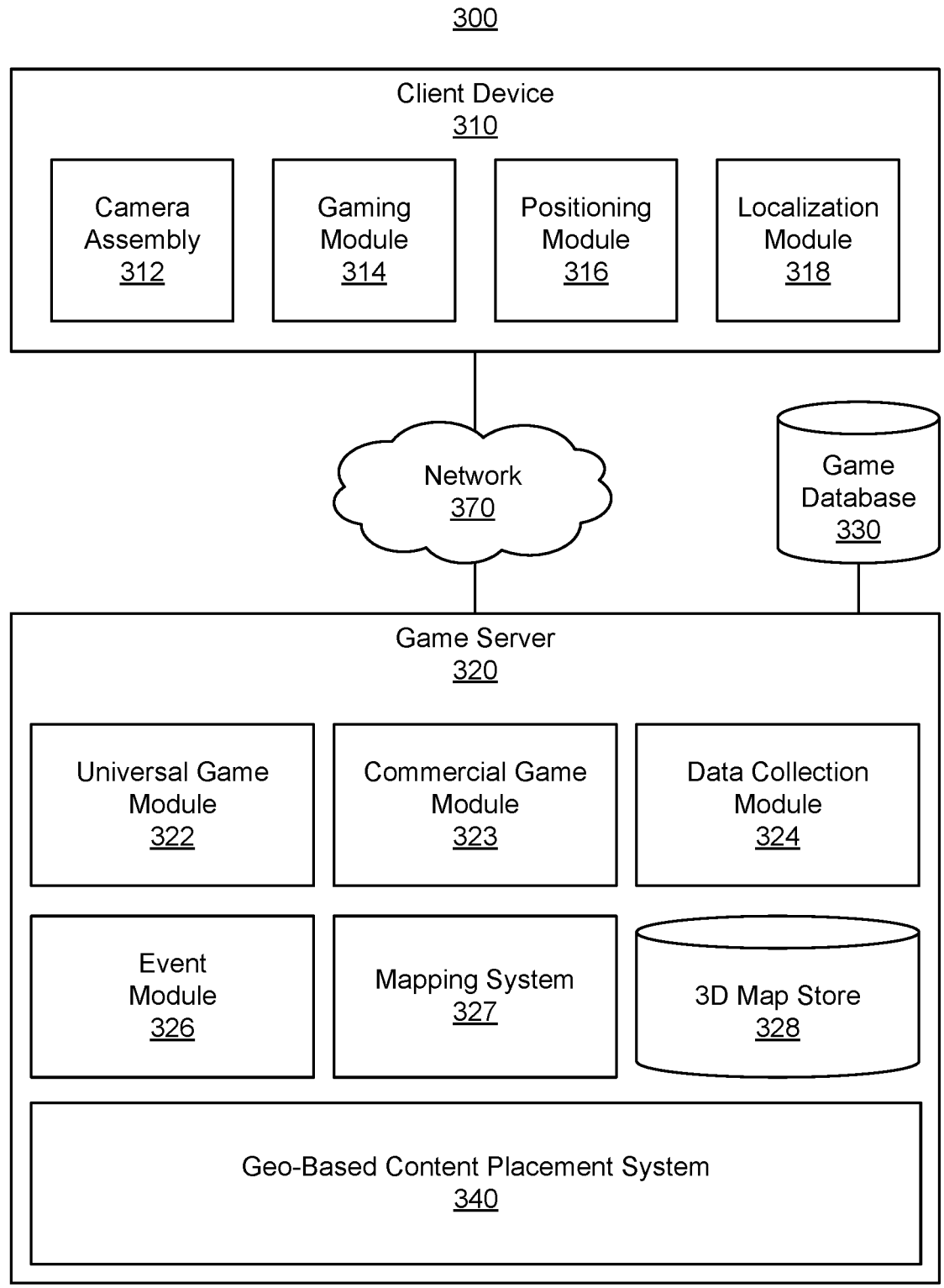
FIG. 3 illustrates one embodiment of a networked computing environment, according to one example embodiment.

FIG. 3 illustrates one embodiment of a networked computing environment 300. The networked computing environment 300 uses a client-server architecture, where a game server 320 communicates with a client device 310 over a network 370 to provide a parallel-reality game to a player at the client device 310. The networked computing environment 300 also may include other external systems such as sponsor/advertiser systems or business systems. Although only one client device 310 is shown in FIG. 3, any number of client devices 310 or other external systems may be connected to the game server 320 over the network 370. Furthermore, the networked computing environment 300 may contain different or additional elements and functionality may be distributed between the client device 310 and the server 320 in different manners than described below.

The networked computing environment 300 provides for the interaction of players in a virtual world having a geography that parallels the real world. In particular, a geographic area in the real world can be linked or mapped directly to a corresponding area in the virtual world. A player can move about in the virtual world by moving to various geographic locations in the real world. For instance, a player's position in the real world can be tracked and used to update the player's position in the virtual world. Typically, the player's position in the real world is determined by finding the location of a client device 310 through which the player is interacting with the virtual world and assuming the player is at the same (or approximately the same) location. For example, in various embodiments, the player may interact with a virtual element if the player's location in the real world is within a threshold distance (e.g., ten meters, twenty meters, etc.) of the real-world location that corresponds to the virtual location of the virtual element in the virtual world. For convenience, various embodiments are described with reference to "the player's location" but one of skill in the art will appreciate that such references may refer to the location of the player's client device 310.

A client device 310 can be any portable computing device capable for use by a player to interface with the game server 320. For instance, a client device 310 is preferably a portable wireless device that can be carried by a player, such as a smartphone, portable gaming device, augmented reality (AR) headset, cellular phone, tablet, personal digital assistant (PDA), navigation system, handheld GPS system, or other such device. For some use cases, the client device 310 may be a less-mobile device such as a desktop or a laptop computer. Furthermore, the client device 310 may be a vehicle with a built-in computing device.

The client device 310 communicates with the game server 320 to provide sensory data of a physical environment. In one embodiment, the client device 310 includes a camera assembly 312, a gaming module 314, positioning module 316, and localization module 318. The client device 310 also includes a network interface (not shown) for providing communications over the network 370. In various embodiments, the client device 310 may include different or additional components, such as additional sensors, display, and software modules, etc.

The camera assembly 312 includes one or more cameras which can capture image data. The cameras capture image data describing a scene of the environment surrounding the client device 110 with a particular pose (the location and orientation of the camera within the environment). The camera assembly 312 may use a variety of photo sensors with varying color capture ranges and varying capture rates. Similarly, the camera assembly 312 may include cameras with a range of different lenses, such as a wide-angle lens or a telephoto lens. The camera assembly 312 may be configured to capture single images or multiple images as frames of a video.

The client device 310 may also include additional sensors for collecting data regarding the environment surrounding the client device, such as movement sensors, accelerometers, gyroscopes, barometers, thermometers, light sensors, microphones, etc. The image data captured by the camera assembly 312 can be appended with metadata describing other information about the image data, such as additional sensory data (e.g. temperature, brightness of environment, air pressure, location, pose etc.) or capture data (e.g. exposure length, shutter speed, focal length, capture time, etc.).

The gaming module 314 provides a player with an interface to participate in the parallel-reality game. The game server 320 transmits game data over the network 370 to the client device 310 for use by the gaming module 314 to provide a local version of the game to a player at locations remote from the game server. In one embodiment, the gaming module 314 presents a user interface on a display of the client device 310 that depicts a virtual world (e.g. renders imagery of the virtual world) and allows a user to interact with the virtual world to perform various game objectives. In some embodiments, the gaming module 314 presents images of the real world (e.g., captured by the camera assembly 312) augmented with virtual elements from the parallel-reality game. In these embodiments, the gaming module 314 may generate or adjust virtual content according to other information received from other components of the client device 310. For example, the gaming module 314 may adjust a virtual object to be displayed on the user interface according to a depth map of the scene captured in the image data.

The gaming module 314 can also control various other outputs to allow a player to interact with the game without requiring the player to view a display screen. For instance, the gaming module 314 can control various audio, vibratory, or other notifications that allow the player to play the game without looking at the display screen.

The positioning module 316 can be any device or circuitry for determining the position of the client device 310. For example, the positioning module 316 can determine actual or relative position by using a satellite navigation positioning system (e.g. a GPS system, a Galileo positioning system, the Global Navigation satellite system (GLONASS), the BeiDou Satellite Navigation and Positioning system), an inertial navigation system, a dead reckoning system, IP address analysis, triangulation and/or proximity to cellular towers or Wi-Fi hotspots, or other suitable techniques.

As the player moves around with the client device 310 in the real world, the positioning module 316 tracks the position of the player and provides the player position information to the gaming module 314. The gaming module 314 updates the player position in the virtual world associated with the game based on the actual position of the player in the real world. Thus, a player can interact with the virtual world simply by carrying or transporting the client device 310 in the real world. In particular, the location of the player in the virtual world can correspond to the location of the player in the real world. The gaming module 314 can provide player position information to the game server 320 over the network 370. In response, the game server 320 may enact various techniques to verify the location of the client device 310 to prevent cheaters from spoofing their locations. It should be understood that location information associated with a player is utilized only if permission is granted after the player has been notified that location information of the player is to be accessed and how the location information is to be utilized in the context of the game (e.g. to update player position in the virtual world). In addition, any location information associated with players is stored and maintained in a manner to protect player privacy.

The localization module 318 receives the location determined for the client device 310 by the positioning module 316 and refines it by determining a pose of one or more cameras of the camera assembly 312. In one embodiment, the localization module 318 uses the location generated by the positioning module 316 to select a 3D map of the environment surrounding the client device 310. The localization module 318 may obtain the 3D map from local storage or from the game server 320. The 3D map may be a point cloud, mesh, or any other suitable 3D representation of the environment surrounding the client device 310.

In one embodiment, the localization module 318 applies a trained model to determine the pose of images captured by the camera assembly 312 relative to the 3D map. Thus, the localization model can determine an accurate (e.g., to within a few centimeters and degrees) determination of the position and orientation of the client device 310. The position of the client device 310 can then be tracked over time using dad reckoning based on sensor readings, periodic re-localization, or a combination of both. Having an accurate pose for the client device 310 may enable the game module 314 to present virtual content overlaid on images of the real world (e.g., by displaying virtual elements in conjunction with a real-time feed from the camera assembly 312 on a display) or the real world itself (e.g., by displaying virtual elements on a transparent display of an AR headset) in a manner that gives the impression that the virtual objects are interacting with the real world. For example, a virtual character may hide behind a real tree, a virtual hat may be placed on a real statue, or a virtual creature may run and hide if a real person approaches it too quickly.

The game server 320 includes one or more computing devices that provide game functionality to the client device 310. The game server 320 can include or be in communication with a game database 330. The game database 330 stores game data used in the parallel-reality game to be served or provided to the client device 320 over the network 370.

The game data stored in the game database 330 can include: (1) data associated with the virtual world in the parallel-reality game (e.g. imagery data used to render the virtual world on a display device, geographic coordinates of locations in the virtual world, etc.); (2) data associated with players of the parallel-reality game (e.g. player profiles including but not limited to player information, player experience level, player currency, current player positions in the virtual world/real world, player energy level, player preferences, team information, faction information, etc.); (3) data associated with game objectives (e.g. data associated with current game objectives, status of game objectives, past game objectives, future game objectives, desired game objectives, etc.); (4) data associated with virtual elements in the virtual world (e.g. positions of virtual elements, types of virtual elements, game objectives associated with virtual elements; corresponding actual world position information for virtual elements; behavior of virtual elements, relevance of virtual elements etc.); (5) data associated with real-world objects, landmarks, positions linked to virtual-world elements (e.g. location of real-world objects/landmarks, description of real-world objects/landmarks, relevance of virtual elements linked to real-world objects, etc.); (6) game status (e.g. current number of players, current status of game objectives, player leaderboard, etc.); (7) data associated with player actions/input (e.g. current player positions, past player positions, player moves, player input, player queries, player communications, etc.); or (8) any other data used, related to, or obtained during implementation of the parallel-reality game. The game data stored in the game database 330 can be populated either offline or in real time by system administrators or by data received from users (e.g., players) of the system 300, such as from a client device 310 over the network 370.

In one embodiment, the game server 320 is configured to receive requests for game data from a client device 310 (for instance via remote procedure calls (RPCs)) and to respond to those requests via the network 370. The game server 320 can encode game data in one or more data files and provide the data files to the client device 310. In addition, the game server 320 can be configured to receive game data (e.g. player positions, player actions, player input, etc.) from a client device 310 via the network 370. The client device 310 can be configured to periodically send player input and other updates to the game server 320, which the game server uses to update game data in the game database 330 to reflect any and all changed conditions for the game.

In the embodiment shown in FIG. 3, the game server 320 includes a universal game module 322, a commercial game module 323, a data collection module 324, an event module 326, a mapping system 327, a 3D map store 328, and a geo-based content placement system ("GCPS") 340. As mentioned above, the game server 320 interacts with a game database 330 that may be part of the game server or accessed remotely (e.g., the game database 330 may be a distributed database accessed via the network 370). In other embodiments, the game server 320 contains different or additional elements. In addition, the functions may be distributed among the elements in a different manner than described.

The universal game module 322 hosts an instance of the parallel-reality game for a set of players (e.g., all players of the parallel-reality game) and acts as the authoritative source for the current status of the parallel-reality game for the set of players. As the host, the universal game module 322 generates game content for presentation to players (e.g., via their respective client devices 310). The universal game module 322 may access the game database 330 to retrieve or store game data when hosting the parallel-reality game. The universal game module 322 may also receive game data from client devices 310 (e.g. depth information, player input, player position, player actions, landmark information, etc.) and incorporates the game data received into the overall parallel-reality game for the entire set of players of the parallel-reality game. The universal game module 322 can also manage the delivery of game data to the client device 310 over the network 370. In some embodiments, the universal game module 322 also governs security aspects of the interaction of the client device 310 with the parallel-reality game, such as securing connections between the client device and the game server 320, establishing connections between various client devices, or verifying the location of the various client devices 310 to prevent players cheating by spoofing their location.

The commercial game module 323 can be separate from or a part of the universal game module 322. The commercial game module 323 can manage the inclusion of various game features within the parallel-reality game that are linked with a commercial activity in the real world. For instance, the commercial game module 323 can receive requests from external systems such as sponsors/advertisers, businesses, or other entities over the network 370 to include game features linked with commercial activity in the real world. The commercial game module 323 can then arrange for the inclusion of these game features in the parallel-reality game on confirming the linked commercial activity has occurred. For example, if a business pays the provider of the parallel-reality game an agreed upon amount, a virtual object identifying the business may appear in the parallel-reality game at a virtual location corresponding to a real-world location of the business (e.g., a store or restaurant).

The data collection module 324 can be separate from or a part of the universal game module 322. The data collection module 324 can manage the inclusion of various game features within the parallel-reality game that are linked with a data collection activity in the real world. For instance, the data collection module 324 can modify game data stored in the game database 330 to include game features linked with data collection activity in the parallel-reality game. The data collection module 324 can also analyze data collected by players pursuant to the data collection activity and provide the data for access by various platforms.

The event module 326 manages player access to events in the parallel-reality game. Although the term "event" is used for convenience, it should be appreciated that this term need not refer to a specific event at a specific location or time. Rather, it may refer to any provision of access-controlled game content where one or more access criteria are used to determine whether players may access that content. Such content may be part of a larger parallel-reality game that includes game content with less or no access control or may be a stand-alone, access controlled parallel-reality game.

The mapping system 327 generates a 3D map of a geographical region based on a set of images. The 3D map may be a point cloud, polygon mesh, or any other suitable representation of the 3D geometry of the geographical region. The 3D map may include semantic labels providing additional contextual information, such as identifying objects tables, chairs, clocks, lampposts, trees, etc.), materials (concrete, water, brick, grass, etc.), or game properties (e.g., traversable by characters, suitable for certain in-game actions, etc.). In one embodiment, the mapping system 327 stores the 3D map along with any semantic/contextual information in the 3D map store 328. The 3D map may be stored in the 3D map store 328 in conjunction with location information (e.g., GPS coordinates of the center of the 3D map, a ringfence defining the extent of the 3D map, or the like). Thus, the game server 320 can provide the 3D map to client devices 310 that provide location data indicating they are within or near the geographic area covered by the 3D map.

The network 370 can be any type of communications network, such as a local area network (e.g. intranet), wide area network (e.g. Internet), or some combination thereof. The network can also include a direct connection between a client device 310 and the game server 320. In general, communication between the game server 320 and a client device 310 can be carried via a network interface using any type of wired or wireless connection, using a variety of communication protocols (e.g. TCP/IP, HTTP, SMTP, FTP), encodings or formats (e.g. HTML, XML, JSON), or protection schemes (e.g. VPN, secure HTTP, SSL).

This disclosure makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, processes disclosed as being implemented by a server may be implemented using a single server or multiple servers working in combination. Databases and applications may be implemented on a single system or distributed across multiple systems. Distributed components may operate sequentially or in parallel.

In situations in which the systems and methods disclosed access and analyze personal information about users, or make use of personal information, such as location information, the users may be provided with an opportunity to control whether programs or features collect the information and control whether or how to receive content from the system or other application. No such information or data is collected or used until the user has been provided meaningful notice of what information is to be collected and how the information is used. The information is not collected or used unless the user provides consent, which can be revoked or modified by the user at any time. Thus, the user can have control over how information is collected about the user and used by the application or system. In addition, certain information or data can be treated in one or more ways before it is stored or used, so that personally identifiable information is removed. For example, a user's identity may be treated so that no personally identifiable information can be determined for the user.

II.A Geo-Based Content Placement System

Figure 4:
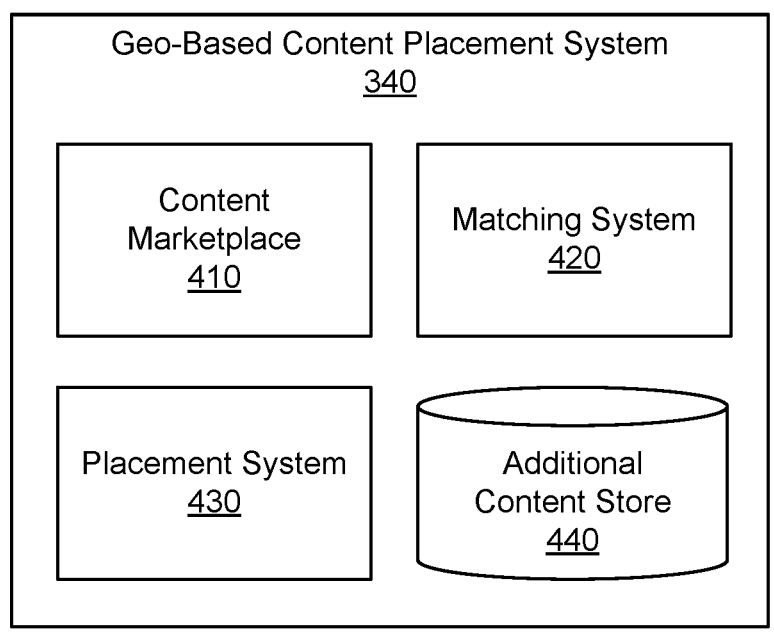
FIG. 4 is a block diagram of the geo-based content placement system of FIG. 3, according to one example embodiment.

FIG. 4 is a block diagram of the geo-based content placement system 340 of FIG. 3, according to one example embodiment. In the embodiment shown, the GCPS 340 includes a content marketplace 410, a matching system 420, a placement system 430, and content store 440. Generally, the GCPS 340 identifies one or more additional content items to provide to users participating in an online parallel-reality application based on one or more of the user's real-world location information, the user's usage characteristics, and the additional content item(s). In other embodiments, the GCPS 340 contains different or additional elements. In addition, functionality of the GCPS 340 may be distributed among the elements in a different manner than described. For instance, the placement system 430 may be integrated into the game server 320.

The GCPS 340 matches additional content items (e.g., third-party parallel-reality content) stored in the additional content store 440 with users playing the parallel-reality game and places the additional content in the parallel-reality experience of the matched users. To do so, as described in greater detail herein, the GCPS 340 may receive real-time information (e.g., location data) and usage characteristics (e.g., preferences, histories, etc.) about the user regarding the parallel-reality game (in aggregate, "user information"). The GCPS 340 may access additional content items from the additional content store for the parallel-reality game based on the received user information. The accessed additional content may be ranked based on an exchange value of the additional content in the content marketplace 410 and/or the usage information.

The GCPS 340 calculates a propensity score. In an example configuration, the propensity score quantifies a degree of overlap between various properties assigned to content (e.g., desired user information, type of content, real-world location characteristics associated with the content, parallel-world location characteristics associated with the content, etc.) and set of properties determined or received from the player (e.g., user information). Given this, the propensity score can also be used to quantify a likelihood a user will interact with the additional content (based on the degree of overlap between content properties and user properties). Once the propensity score is calculated, the GCPS provides the additional content with, for example, the highest propensity score to the parallel-reality experience of the user. In this way, the GCPS 340 matches additional content to a user and inserts the additional content into the parallel-reality experience of the matched user.

Content Marketplace

The GCPS 340 includes a content marketplace 410. The content marketplace 410 manages the valuation and selection of additional content items when matching additional content items to users and placing those items in the user's parallel-reality experience. Typically, additional content items are content items a third-party seeks to introduce into the parallel-reality experience of users. Additional content items, as described in greater detail below, can be graphics, videos, user interactions, spoken or written messages, game content, etc. Additional content items are stored in the additional content store 440.

Generally, an additional content item is introduced (e.g., uploaded) to the content marketplace 410 by a third-party (or some other user such as, e.g., a game server 320 administrator). The GCPS 340 matches the third-party additional content items to users playing of the parallel-reality game and places the third-party additional content items within the parallel-reality game experience of the matched users. To provide a contextual example, consider a third-party restaurant seeking to introduce additional content items into the parallel-reality experience of various users. To further this goal, the restaurant introduces a parallel-reality quest to the content marketplace 410. The parallel-reality quest is a series of in game tasks and/or actions that leads the user to a real-world location associated with the third party (e.g., the real-world location of the restaurant). Once included in the content marketplace 410, the GCPS 340 matches the parallel-reality quest to users playing the parallel-reality game, and the GCPS 340 places the parallel-reality tasks from the quest in the parallel-reality experience of the matched users.

Generally, third parties typically provide a consideration to introduce their additional content into the content marketplace 410. Consideration may take various forms depending on the configuration of the content marketplace 410. For instance, the third-party may provide a monetary payment, promote the augmented reality game, sign a license, or provide some other form of consideration to introduce their additional content in the content marketplace 410. Once included in the content marketplace 410, the additional content items received from third parties may be included in the parallel-reality game via the matching and placement methodologies described.

Because additional content is introduced into the content store for consideration, the additional content has an exchange value within the content store. An exchange value is a quantification of the value for storing, matching, and placing additional content in the parallel-reality game via the content marketplace 410. Exchange value can be represented in different ways within the content marketplace 410. For example, the exchange value may be a dollar amount, a number of content placements, a number of content views, a number of users experiencing content, an engagement score, etc. Other possible exchange values may include a price per view of the additional content item, a price per placement of the additional content item, or some other derivative value relating the consideration to in-game usage per user, groups of users, third-party, or group of third parties, etc. Of course, other exchange values are possible, a first type of exchange value can be converted into another type of exchange value, and exchange values may be combined or reimagined in different manners.

Third parties may define preferred users for their additional content in the content marketplace 410. A preferred user is a user in the parallel-reality game that the third-party is seeking to provide with their additional content (e.g., a target user of the parallel-reality game). Third parties typically define preferred users using a variety of criteria. For example, third parties may define preferred users based on the user information and/or characteristics of the additional content, etc. To illustrate, consider the parallel-reality quest described above. The third-party providing the quest may define preferred users as those users passing within a threshold distance of a real-world location, or a threshold distance of a parallel-reality location. In another example, the third-party may define preferred users as those users having previously interacted with content like that embodied by the quest, or as those who have previously interacted with parallel-reality quests.

Additionally, third parties may define preferred users using a combination of criteria. For instance, the third-party may define a preferred user as someone who (1) walks between location A and location B, (2) between 10:00 AM and 11:00 AM, (3) during the two weeks prior to Christmas Eve, and (4) when it is Sunny outside. Moreover, the third parties may provide weights to the various criteria of the preferred users. For instance, using the previous example, the third-party may indicate that the $1^{st}$ and $3^{rd}$ criteria are more important than the $2^{nd}$ and $4^{th}$ criteria. In this manner, when the content marketplace 410 system can weight different factors of preferred users in matching additional content to users. Additionally, third parties may define preferred users as users who are likely to interact with the additional content. As described in greater detail below, the GCPS 340 may determine the likelihood a user will interact with additional content based on a determined overlap between the user and content, where the degree of overlap may be calculated using many of the factors described above (e.g., real-world location information, usage characteristics, characteristics of the user, characteristics of the additional content, etc.).

In a similar manner, users may define preferred additional content or preferred third parties from which they would prefer to receive additional content. For instance, a user may elect (1) not to view additional content from a specific type of third party, (2) view additional content of a certain type or types, (3) view, or not view, additional content from certain parties, etc. Whatever the case, users may set preferences and boundaries around the additional content that the content marketplace 410 may provide them throughout the course of the parallel-reality game, and/or the user preferences may be used to appropriately match additional content to the user.

The content marketplace 410 may rank additional content in a manner that affects how additional content is matched to users in the parallel-reality game. In an example configuration, the content marketplace 410 may generate a ranked list of additional content items based on the exchange value of the additional content items. For instance, additional content items may be ranked by the cost paid to introduce the additional content items to the content store, the number of views for the additional content item, or the price per placement of the additional content item, etc. The content marketplace 410 may also generate a ranked list of additional content items based on the user information. For instance, a ranked list may consider the location of a user such that the ranked list only includes additional content items within a threshold distance of the user, or, correspondingly, may account for the location of the third-party such that its additional content is only included in ranked lists for users within a threshold distance of the third-party. In another example, the ranked list may consider user preferences such that a ranked list only includes content items relevant to users based on their history, or, correspondingly, may account for the preferences of the third-party when placing its additional content into ranked lists.

Ranking in the content marketplace 410 affects additional content matching because the GCPS 340 may only use a specific number of additional content items in the matching process. For instance, the content marketplace 410 may only match the top ten ranked additional content items to a particular user, rather than matching the user to the thousands of additional content items available in the content marketplace 410. In doing so, the GCPS 340 limits the processing power required to perform the matching and matches additional content items to users more quickly.

Matching System

The GCPS 340 includes a matching system 420. The content marketplace 410 employs the matching system 420 to match additional content items with users when managing the exchange of consideration for additional content placement within the parallel-reality game. The matching system 420 may match the additional content according to various criteria such as, e.g., preferred users, preferred third-parties, user information, additional content characteristics, etc. As an example, consider again the parallel-reality quest provided by the restaurant. The matching system 420 may receive the real-world location information for users and match the quest to all game users within a specific distance of the real-world location of the restaurant. Of course, this is just an example, and the matching system 420 may match users to additional content using more than one matching criteria and more advanced matching methods, some of which are explained in greater detail below.

In some example configurations, the matching system 420 is configured to match the additional content to preferred users based on a propensity score. In an example, the propensity score may be used to estimate a likelihood they will interact with the additional content. For instance, consider again the parallel-reality quest provided by the third-party. In this case, the matching system 420 may determine a propensity for a game user to interact with the virtual quest. In the situation that the propensity is high, the propensity may indicate the user is likely to interact with the virtual quest (e.g., above a threshold value of likelihood, above a threshold degree of overlap for the propensity score, etc.), the matching system 420 may match the virtual quest to the user. Similarly, in the situation that the likelihood indicates that the user is unlikely to interact with the virtual quest (e.g., below a threshold value of likelihood, below a threshold degree of overlap for the propensity score, etc.), the matching system 420 may select different additional content to provide the user.

The matching system 420 may calculate a propensity score to quantify a degree of overlap between various properties assigned to content (e.g., desired user information, type of content, etc.) and set of properties determined or received from the player (e.g., user information). Overlap is generally described as to what degree properties of content match a user. The propensity score can be used to estimate a likelihood the user will interact with additional content given the amount of overlap as described above.

Calculating the propensity score can be based on a variety of criteria (e.g., properties of the content, properties of the user, etc.). For instance, the matching system 420 may generate a higher propensity score for users within a certain distance from a real-world location (because the overlap between content properties and user properties is higher), while generating a lower propensity score for users greater than the distance from the real-world location (because the overlap between content properties and user properties is lower). Similarly, the matching system 420 may generate a higher propensity score for users who have previously interacted with a specific type of content, while it may not change the propensity score for game users who have not previously interacted with that specific type of content. Moreover, the matching system 420 may generate a higher propensity score for a strongly preferred user (e.g., those matching multiple criteria for the additional content), while generating a lower propensity score for a less strongly preferred user (e.g., those matching few criteria for the additional content). Other factors may also affect the propensity score, some of which are additionally described herein.

Again, the matching system 420 is configured to match users to additional content in the content marketplace 410. That being said, in various configurations the matching system 420 may match users to additional content in a prescriptive manner and/or a predictive manner. Prescriptively matching indicates matching additional content to users based on criteria set by the third-party, while predictive matching indicates matching content to users based on a predicted likelihood the user will interact with the content given the determined overlap indicated by the propensity score. To illustrate, returning again to the virtual quest, the restaurant introducing the virtual quest may prescribe that only user's meeting certain criteria receive the quest as additional content. On the other hand, the matching system 420 may predict a likelihood that users will interact with additional content based on user information and criteria received from the third-party, match the additional content to the user based on the prediction, and provide the virtual quest those users. Of course, one skilled in the art will recognize that there is a great deal of overlap in the methodologies implementing either system and the disclosure herein relates generally to both methodologies. Moreover, in many instances, the methodologies may be combined. For instance, a third-party may prescribe a set of acceptable criteria for users to receive an additional content item, and the GCPS 340 may predict which users meeting those criteria are most likely to interact with the additional content. Whatever the case, the matching system 420 facilitates third parties providing additional content to game users.

Recall that the content marketplace 410 matches content with users. When matching additional content items, the content marketplace 410 may employ the matching system 420 in a number of ways, some of which are described below.

In a first example, the matching system 420 may match various additional content items in available in the content marketplace 410 to a particular user based on the user information. For instance, the matching system 420 may match all additional content items, or asset number of content items, available in the content marketplace 410 pertinent to the user given the available user information. Each of the matched additional content items is associated with an exchange value. In this example, the content marketplace 410 may then select only the matching additional content item having, for example, the highest exchange value for inclusion into the users parallel-reality game experience. In other words, the content marketplace 410 may match the additional content item having the highest exchange value from the ranked list of content items to the user.

In a second example, the matching system 420 may match additional content items in the content marketplace 410 to a particular user for which they are a preferred user for the additional content item (e.g., meet criteria set forth by the third-party). The matching system 420 may then calculate a propensity score for each additional content item based on their user information as described above. In this example, the content marketplace 410 may then select only the matching additional content item having, for example, the highest propensity score to the user. In other words, the content marketplace 410 may match the additional content item that satisfies third-party criteria and is calculated as being the additional content item the user is most likely to interact with.

In a third example, the matching system 420 may introduce an additional content auction to match content to users. An additional content auction allows a third-party to bid on providing additional content to a user. To expand, in this example, the matching system 420 may match various additional content items to a user, and the matching system 420 may generate a propensity score for each additional content item. Thus, a third-party may "know" how much overlap there is between their content item and the user, and can thereby estimate how likely a user is to interact with their additional content item. As such, the various third parties may bid on providing additional content items to the user based on the determined propensity score within the content marketplace 410. For instance, a first third-party may bid a first value, a second third-party may bid a second value, etc. The content marketplace 410 may select the additional content item from the third-party who bids the highest amount in the auction for inclusion into the user's parallel-reality experience.

Typically, the auction process is automated and based on the exchange value of additional content in the content store. As a simple example, consider two different third parties that are paying to store content in the content store. The first third-party indicates that it is willing to pay up to $1.00 to provide a matched user its additional content based on the corresponding propensity score, and the second third-party indicates that it is willing to pay up to $1.75 to provide the matched user its additional content based on the propensity score. In this case, the second third-party may pay the GCPS 340 an amount greater than $1.00 and less than $1.75 to provide the matched user additional content because it has bid more for showing their additional content item to the user.

Placement System

The GCPS 340 includes a placement system 430. The content marketplace 410 employs the placement system 430 to place additional content items within the parallel-reality game of matched users. Placement of additional content items in the parallel-reality game can take many forms. For instance, the additional content item may be a parallel-reality object, text displayed in the parallel-reality, audio played from the user device, in-game objects, in-game gifts or bonuses, in-game tasks, challenges, notifications, or enemies, in-game resources, mechanics or missions for gameplay, etc. Other examples of placed additional content items are also possible.

In some instances, the placement system 430 may place the additional content items in the parallel-reality game in a manner prescribed by the introducing third-party. For example, an additional content item may be a parallel-reality content item having a specific configuration and the third-party may dictate that the content item should be placed in the parallel-reality game according to those specifications. Accordingly, the placement system 430 may place the additional content item (e.g., a quest) in the parallel-reality game for matched users using the defined configuration.

The placement system 430 may place the additional content items in the parallel-reality game in a manner appropriate for in-game circumstances. For example, the parallel-reality game may include a pre-configured content item, and that pre-configured content item may display matched additional content items to users viewing the pre-configured content item. In this case, the placement system 430 may modify and/or generate an additional content item such that it may be displayed on the pre-configured content. For instance, the placement system 430 may modify graphics and text of an additional content item for display on the pre-configured content item even though the additional content item was not specifically designed for the pre-configured content item or may generate an entirely new additional content item representing the additional content item that is capable of being presented via the pre-configured content item. Other examples are also possible.

The placement system 430 may generate and/or modify additional content items when placing the additional content item in the parallel-reality world to encourage increased engagement with the additional content item. For example, the placement system 430 may generate a series of gameplay interactions to encourage the user to move to a location where an additional content item is visible placed in the parallel-reality game. In a similar example, the placement system 430 may generate an in-game mission that causes a user to move towards the real-world location of the third-party introducing an additional content item into the content marketplace 410. Upon completing the mission, the placement system 430 may give the additional content item as an in-game reward to the user for completing the mission. In this way, the placement system 430 encourages the user to both move towards the real-world location of the third-party and interact with the third-party in the real world.

Finally, various placement methodologies may be used to affect both the matching process and exchange value of additional content items. For example, a third party may introduce an additional content item into the content marketplace and limit it to a specific configuration within the parallel reality world. Due to the limitations, the matching system 420 may only match users in situations where the specific configuration of the additional content item is possible, while additional content items with more robust implementation possibilities are able to be matched to a larger number of users. In situations like these, the additional content items that may match more users may have a higher exchange value in the content marketplace than those content items with limited implementations because of their broader applicability.

II.B Examples of Content Matching

As previously described, the GCPS 340 employs the matching system 420 to match additional content items in the content marketplace 410 to users playing the parallel-reality game. To do so, in an example embodiment, the matching system 420 accesses a ranked list of additional content items from the content marketplace 410. The additional content items are ranked on the ranked list based on the exchange values of the additional content items. The matching system 420 calculates a propensity score for each additional content item on the ranked list that quantifies a degree of overlap between a user and the additional content item. Calculating the propensity score can be based on any of real-world location information, usage characteristics information describing the user, and/or characteristics of the additional content item. The content marketplace 410 matches the additional content item to a user based on the propensity score.

Real-world location information may include the real-world location of the third-party introducing the additional content item into the content store, the real-world location of the user, the real-world location corresponding to a parallel-reality object, event, or location, the real-world location of a real-world point of interest (e.g., the user's home, a business, a monument, an attraction, an event, etc.), the direction, speed, and/or acceleration of a user in the real-world, the real-world time, weather, season, time of day, characteristic of the real world location (e.g., elevation, population, ground type, outdoor or indoor, noisiness), etc.

Usage characteristics describing the user can include time of day the user plays the parallel-reality game, times the user is in a particular location, method of travel for the user (e.g., walking, jogging, scooter, car, etc.), length of time a user plays the parallel-reality game, characteristics of the user's device (e.g., battery life, device operating system, etc.), colocation with other user, colocation with other linked users (e.g., friends), karma related measures (e.g., how a user plays, rather than how much they play), etc.

Characteristics of the additional content items may include a parallel-reality use for the additional content item, a parallel-reality location for presenting the additional content item, an exchange value of the parallel content item, the method of presenting the parallel-reality additional content item, etc. All of these characteristics may also occur on a time varying scale, e.g., a variation in exchange value, or a change in use of a parallel-reality item.

The description now provides several examples of the matching system 420 matching additional content items in the content marketplace 410 to users of the parallel-reality game. Notably, the examples provided are not intended to be limiting. Moreover, many of the presented examples employ predictive methodologies based on a propensity score. However, many of the examples find similar use cases for prescriptive methodologies which may not be explicitly described.

Exchange Value

The matching system 420 may match additional content items in the content marketplace 410 to users based on an exchange value of the additional content item (e.g., price, cost, value). To illustrate, the content marketplace 410 may rank additional content items and generate a ranked list based on, for example, a cost per placement of the additional content item in the parallel-reality experience of a matched user (or some other exchange value). The matching system 420 may then calculate a propensity score matching additional content items on the ranked list to users of the parallel-reality game based on, at least, the exchange value of the additional content item. For example, the matching system 420 may determine a propensity score for the additional content item that is directly proportional to the exchange value of the additional content item. In this manner, additional content items having a higher exchange value are more likely to be matched to a user than additional content items having a lower exchange value. Of course, because the propensity score may be based on other factors, a large exchange value does not necessarily cause a user to be matched to an additional content item.

Time

The matching system 420 may match additional content items in the content marketplace 410 to users based on a preferred presentation time of the additional content item (e.g., lunch time, evening, 6 pm-9 pm, etc.). To illustrate, a third-party may prescribe a preferred time for its additional content item to be matched and presented to a user in the parallel-reality game, and the matching system 420 may determine a propensity score for the content item that accounts for its preferred time. In an example, the matching system 420 accesses a preferred time for the additional content item and determines an actual time the user is interacting with content in the parallel-reality game based on the user's real-time location information. The matching system 420 then determines the propensity score for the additional content item by comparing the preferred time for the additional content item and the actual time. In this example, the propensity score for the additional content item is inversely proportional to a difference between the actual time and the preferred time. That is, when the actual time and the preferred time are temporally proximate the propensity score is high, and when the actual time and the preferred time are temporally disparate the propensity score is low.

Location

The matching system 420 may match additional content items in the content marketplace 410 to users based on a preferred presentation location of the additional content item (e.g., a real-world coordinate, a real-world point of interest, a parallel-world coordinate, a parallel-world point of interest, etc.). To illustrate, a third-party may prescribe a preferred location for its additional content item, and the matching system 420 determines a propensity score that accounts for the preferred location. In an example, the matching system 420 accesses a preferred location for the additional content item and determines an actual location of user based on the user's real-time location information. The matching system 420 then determines the propensity score for the additional content item by comparing the preferred location for the additional content item and the user's real-world location. In an example, the propensity score for the additional content item is inversely proportional to a difference between the actual location and the preferred location. That is, when the actual location and the preferred location are proximate the propensity score is high, and when the actual location and the preferred location are disparate the propensity score is low.

In a similar manner, the matching system 420 may match additional content items in the content marketplace 410 with users based on the user's relative location to a geo-fence. For example, a third-party may prescribe a geo-fence for an additional content item. A geo-fence is an area within (or without) which the third-party prefers to present an additional content item. In turn, the matching system 420 may determine a propensity score for the additional content item based on the geo-fence. For example, the matching system 420 may increase a propensity score for an additional content item when a user enters (or exits) a geo-fence and may decrease a propensity score for the additional content item when the user exits (or enters) the geo-fence. Geo-fences may be based on either real world or parallel-reality locations.

User Information

The matching system 420 may match additional content items in the content marketplace 410 with users based on user information (e.g., commute habits, play times, play characteristics, personal calendar, method of travel, etc.).

To illustrate, a third-party may prescribe preferred travel characteristics (e.g., driver, scooter, walk, jog, fly, etc.) for its additional content item, and the matching system 420 determine a propensity score that accounts for the preferred travel characteristics of the user. In an example, the matching system 420 accesses a user's preferred method of travel (e.g., via a user profile, based on average speed playing the parallel-reality game, etc.) and accesses the preferred method of travel for the additional content item. The matching system 420 then determines the propensity score for the additional content item by comparing the preferred travel method for the additional content item and the user's determined travel method. In an example, the propensity score for the additional content item is proportional to a degree to which the preferred travel method matches the user's actual travel method. That is, when the preferred travel method (e.g., driving a car) for the additional content item is similar to the actual travel method of the user (e.g., driving a scooter) the propensity score is high, and when the preferred travel method for the additional content item is different than the actual travel method (e.g., walking) the propensity score is low.

In another example, a propensity score can be based on any of a user's gameplay characteristics, a user's calendar, and/or a user's typical play times. That is, a propensity score for an additional content item may be higher (or lower) at certain times based on those characteristics. For example, a user of the parallel reality game may play the game over her lunch break. As such, the propensity score for additional content items may be higher at the beginning of the users lunch break relative to the end of the users lunch break because the user is less likely to interact with additional content items towards the end of their lunch break. More broadly, the matching system 420 may determine a typical usage pattern for the user and determine a propensity score based on the user's typical usage pattern.

In another example, the propensity score may be based on the health characteristics of a user. In this example, the matching system 420 determines real-time health characteristics (e.g., age, fitness level, blood pressure, pulse, etc.) of the user based on the user information (e.g., via a profile, determining based on age and usage, walking speed, etc.) and accesses the preferred health characteristics for the additional content item. In turn the matching system 420 determines the propensity score for the additional content item based on the preferred health characteristics and the real-time health characteristics. In an example, the propensity score for the additional content item is proportional to a degree to which the preferred health characteristics and real-time health characteristics match.

Content Characteristics

The matching system 420 may match additional content items in the content marketplace 410 with users based on the additional content items themselves.

To illustrate, a third-party may prescribe a preferred content type for its additional content item (e.g., static object, dynamic object, static game content, dynamic game content, etc.), and the matching system 420 determines a propensity score that accounts for the preferred content type. For example, the matching system 420 accesses a preferred content type for the additional content item and determines an actual content type suitable for the user. The suitable content type is a content type that is appropriate for the particular user at the users current real-world and parallel-reality location. For example, in certain locations, dynamic game content may not be suitable while static content is suitable. The matching system 420 then determines the propensity score for the additional content item by comparing the preferred content type for the additional content item and the suitable content type at the user's real-world location and parallel-reality locations. The propensity score for the additional content item may be proportional to a degree in which the preferred content type matches the suitable content type.

In another example, the user may be interacting with content in the parallel content game. As part of that interaction, the user may be navigating from a first real-world/parallel-reality location to a second real-world/parallel-reality location along a navigation path. The navigation path may be a part of the parallel game content or a natural evolution of the user's interactions with game content. In this situation, the matching system 420 determines the navigation path for the user based on the user information. The matching system may then identify a proximity between various points on the navigation path and the additional content items in the content marketplace 410. The matching system determines a propensity score for the additional content items based on the proximity of the additional content item and the user information. Here, the propensity score may also represent the likelihood that the user will interact with additional content given the determined proximity and, e.g., their usage characteristics. In this way, the matching system can match additional content items it believes a user is likely to interact with as they navigate a path.

Location Circumstances

The matching system 420 may match additional content items in the content marketplace 410 based on circumstances of real-world or parallel-world locations (e.g., a real-world weather, real-world events, parallel-world events, parallel-world content, etc.).

To illustrate, a third-party may prescribe a preferred real-world weather conditions (e.g., sunny, rainy, foggy, cold, hot, etc.) for its additional content item, and the matching system 420 determines a propensity score that accounts for the preferred real-world weather conditions. In an example, the matching system 420 accesses a preferred weather condition for the additional content item and determines an actual weather condition at the location of the user based on the user's real-time location information. The matching system 420 then determines the propensity score for the additional content item by comparing the preferred weather condition for the additional content item and the weather condition at the user's real-world location. The propensity score for the additional content item may be proportional to a degree in which the preferred weather conditions and real-world weather conditions match. That is, when the preferred weather condition (e.g., sunny and mild) for the additional content item is similar to the actual weather condition near the user (e.g., lightly cloudy and warm) the propensity score is high, and when the preferred weather condition for the additional content item is similar to the actual weather condition near the user (e.g., rainy and cold) the propensity score is low.

Similar determinations can be made for other location circumstances. For example, a propensity score can be based on the occurrence of a real-world event (e.g., a conference a holiday celebration, a museum event etc.) and/or the occurrence of a parallel-world event (e.g., a raid, a mission, a meetup, an exchange, etc.). That is, when the real or parallel-reality event is occurring, the propensity score may be higher than when the real or parallel-reality even is not occurring. In another example, a propensity score can be based on an existence, or a likelihood, of vehicle traffic, travel detour, person density, etc. at a real-world location. For example, a propensity score may be higher when the existence, or the likelihood, of vehicle traffic is lower at a real-world location. Other examples are also possible.

II.C Examples of Content Placement

As previously described, the GCPS 340 employs the placement system 430 to place matched additional content items into the parallel-reality game experience of matched users. To do so, the placement system 430 may place the additional content item into the parallel-reality game in a variety of manners, some of which are described below.

Static Objects

The placement system 430 can place additional content items as static parallel-reality objects. For example, the placement system 430 may place the additional content item as a static virtual object such as a quest, sign-post, poster, display, building, etc. The placement system 430 may place the additional content item as a static object based on specifications provided by the third-party providing the content item. In another example, the placement system 430 may generate a static object representing the additional content item and provide the static content item for display to the user while they interact with content in the parallel-reality game. In some examples, the static content item may represent the additional content item with the highest propensity score.

Dynamic Objects

The placement system 430 can place additional content items as dynamic parallel-reality objects. For example, the placement system 430 may place the additional content item as a dynamic virtual object such as a moving animation or object, a video, an interactable avatar, etc. The placement system 430 may place the additional content item as a dynamic object based on specifications provided by the third-party providing the content item. In another example, the placement system 430 may generate a dynamic object and provide the dynamic content item for display to the user while they interact with content in the parallel-reality game. In some examples, the dynamic content item may represent the additional content item with the highest propensity score.

Static Game Content

The placement system 430 can place additional content items as static parallel-reality game content. Here, game content generally indicates that the additional content item is integrated into various gameplay actions and schema, rather than being presented in the parallel-reality world in a manner independent from gameplay in the parallel-reality. For example, the placement system 430 may place the additional content item as a branded game item, loot, an in-game reward, etc. The placement system 430 may place the additional content item as a static game object based on specifications provided by the third-party providing the content item. In another example, the placement system 430 may generate static game content representing the additional content item and provide the static game content item for display to the user while they interact with content in the parallel-reality game. In some examples, the static content item represents the additional content item with the highest propensity score.

Dynamic In-Game Content

The placement system 430 can place additional content items as dynamic parallel-reality game content. Here, game content generally indicates that the additional content item is integrated into various gameplay actions and schema, rather than being presented in the parallel-reality world in a manner independent from gameplay. For example, the placement system 430 may place the additional content item as in-game missions, pathing, in-game text and video, in-game animations, etc. The placement system 430 may place the additional content item as dynamic in-game content based on specifications provided by the third-party providing the content item. In another example, the placement system 430 may generate dynamic in-game content representing the additional content item and provide the dynamic in-game content item for display to the user while they interact with content in the parallel-reality game. In some examples, the dynamic in-game content item may represent the additional content item with the highest propensity score.

II.D Content for Groups

The GCPS 340 is also configured to facilitate group play in the parallel-reality game. For example, the matching system 420 can match groups of users to additional content items in the content marketplace 410. That is, rather than accessing user information for an individual user, the matching system 420 may access user information for a group of users, aggregate that information, and match additional content to the group of users in manner that fosters group participation. For example, several users may be linked in the parallel-reality game as, e.g., "friends" or "team-mates". As such, the users may want to participate in similar missions, participate in the same area, etc., and as such, it would be beneficial to provide additional content items to the users that fosters group participation. Accordingly, the matching system 420 may be configured to match a group of users to an additional content item such that all the users receive a similar additional content item.

In these cases, the placement system 430 may also place the additional content items in a manner that facilitates group participation. For instance, the placement system 430 may generate dynamic game content that encourages the group of users to navigate to the same location, participate in similar missions, or have gameplay interactions using additional content items. For example, the placement system may generate, for each user in the group, additional content items comprising a sequential series of mission points at different locations in the real world. By accomplishing the series of sequential mission points in order, the users will all migrate towards a single location where they will be in close proximity. In this way, the placement system 430 generates additional content items that encourages users in disparate areas to migrate into the same area using additional content items. Other additional content item placement within the parallel-reality game that encourages group participation is also possible.

III. Example Method for Adding Content to a Parallel-Reality Game

Figure 5:
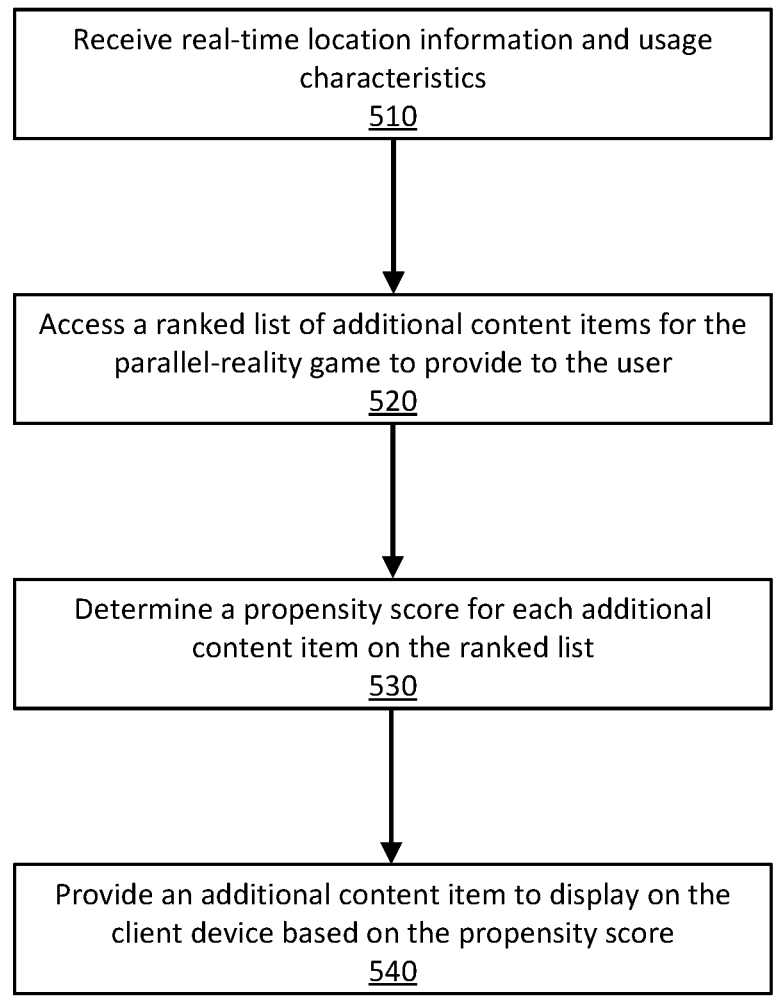
FIG. 5 is a flow chart illustrating a method for providing location-based interactions in a parallel reality game, according to one example embodiment.

FIG. 5 is a flow chart illustrating a method for providing location-based interactions in a parallel reality game, according to one example embodiment. In some embodiments, the method 500 is performed by the GCPS 340, although some or all of the operations in the method 500 may be performed by other entities in other embodiments. In some embodiments, the operations in the method 500 are performed in a different order and can include different or additional steps A game server (e.g., game server 320) generates a parallel-reality game mirroring the real-world environment. The parallel reality game provides various game play elements to users operating client devices (e.g., client device 310) in the real-world. The users interact with the parallel-reality game content as they move about the real world and operate their client device.

As they participate in the game, the game server receives 510 real-time location information and usage characteristics from users interacting with content in the parallel reality game. The real-time location information is transmitted from the user's client to the game server. The real-time location information includes, for example, location coordinates, direction, speed, etc. The usage characteristics includes, for example, typical gameplay styles and gameplay times.

In order to provide additional content items to user's playing the game, the game server includes a content marketplace (e.g., content marketplace 410). The content marketplace is configured to manage the exchange of consideration for placement of the additional content items in the parallel-reality experience of users playing the game. The additional content items therefore have an exchange value in the content marketplace.

To match content to users, the content marketplace accesses 520 a ranked list of additional content items for the parallel-reality game to provide to users interacting with content in the parallel-reality game. The additional content items on the ranked list are generally ranked based on their exchange value. In some cases the content marketplace only accesses a number (e.g., 5, 10, 20, 50) of additional content items for the ranked list.

The content marketplace matches the additional content items to users playing the parallel-reality game. To do so, the content marketplace determines 530 a propensity score for each additional content item in the ranked list. The propensity score quantifies a degree of overlap between a content item and a user based on characteristics and properties of each. The propensity score can therefore be used to estimate a likelihood the user will interact with the additional content item while interacting with content in the parallel-reality game based on the overlap. Moreover, the propensity score is calculated based on the real-world location information, usage characteristics describing the user, and the additional content items on the list as described hereinabove.

After determining the propensity scores for each item on the ranked list, the content marketplace provides 540 one or more additional content items to the user playing the parallel reality game. In an example, the content marketplace provides the additional content item having the highest propensity score to the user's client device for display in the parallel-reality game.

IV. Example Computing System

Figure 6:
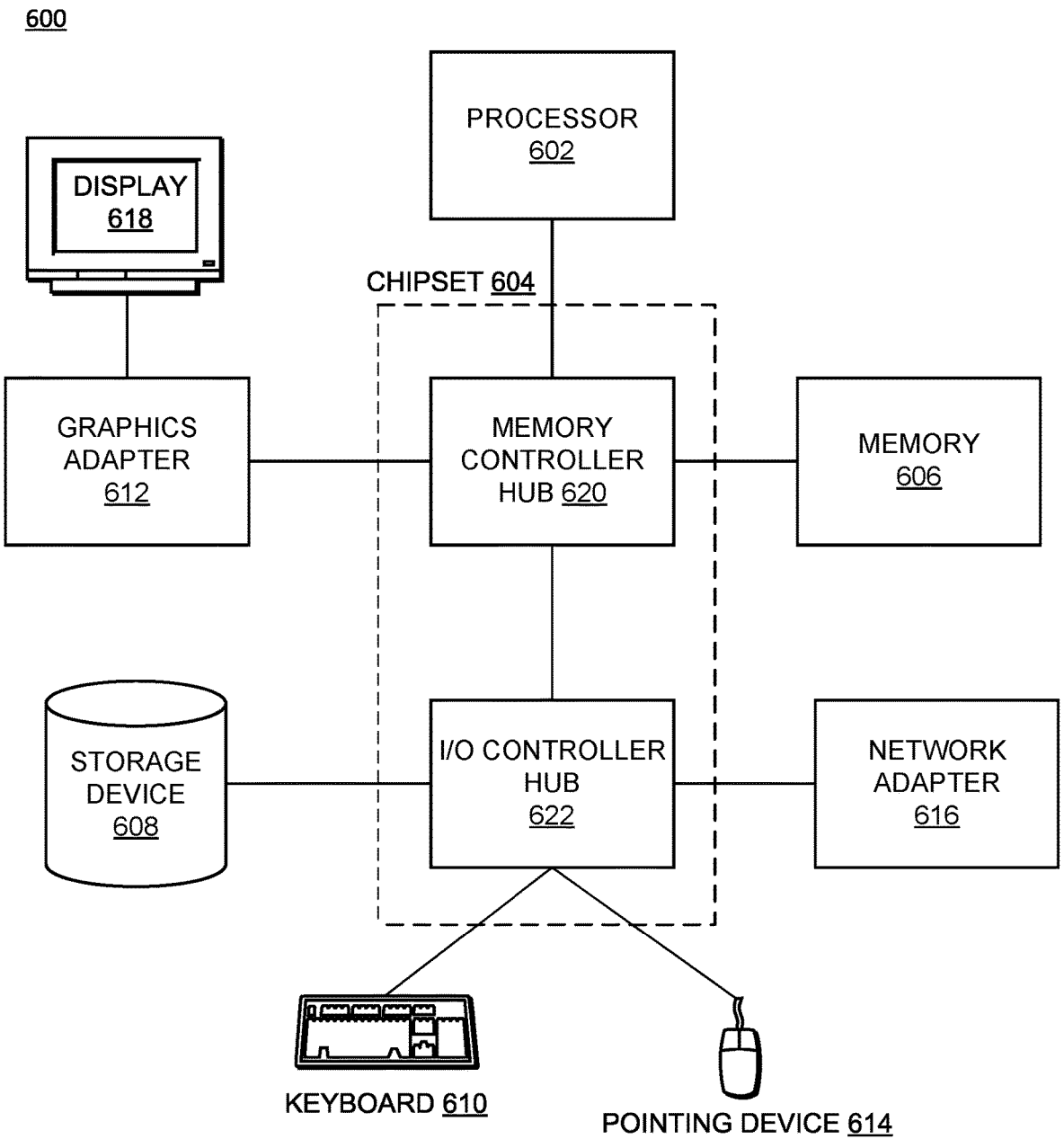
FIG. 6 is a block diagram of an example computer suitable for use as a client device or game server, according to one example embodiment.

FIG. 6 is a block diagram of an example computer 600 suitable for use as a client device 310 or game server 320. The example computer 600 includes at least one processor 602 coupled to a chipset 604. The chipset 604 includes a memory controller hub 620 and an input/output (I/O) controller hub 622. A memory 606 and a graphics adapter 612 are coupled to the memory controller hub 620, and a display 618 is coupled to the graphics adapter 612. A storage device 608, keyboard 610, pointing device 614, and network adapter 616 are coupled to the I/O controller hub 622. Other embodiments of the computer 600 have different architectures.

In the embodiment shown in FIG. 6, the storage device 608 is a non-transitory computer-readable storage medium such as a hard drive, compact disk read-only memory (CD-ROM), DVD, or a solid-state memory device. The memory 606 holds instructions and data used by the processor 602. The pointing device 614 is a mouse, track ball, touch-screen, or other type of pointing device, and may be used in combination with the keyboard 610 (which may be an on-screen keyboard) to input data into the computer system 600. The graphics adapter 612 displays images and other information on the display 618. The network adapter 616 couples the computer system 600 to one or more computer networks, such as network 370.

The types of computers used by the entities of FIGS. 3 and 4 can vary depending upon the embodiment and the processing power required by the entity. For example, the game server 320 might include multiple blade servers working together to provide the functionality described. Furthermore, the computers can lack some of the components described above, such as keyboards 610, graphics adapters 612, and displays 618.

V. Additional Considerations

Some portions of above description describe the embodiments in terms of algorithmic processes or operations. These algorithmic descriptions and representations are commonly used by those skilled in the computing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

Any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Similarly, use of "a" or "an" preceding an element or component is done merely for convenience. This description should be understood to mean that one or more of the elements or components are present unless it is obvious that it is meant otherwise.

Where values are described as "approximate" or "substantially" (or their derivatives), such values should be construed as accurate +/−10% unless another meaning is apparent from the context. From example, "approximately ten" should be understood to mean "in a range from nine to eleven."

The terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs for a system and a process for providing the described functionality. Thus, while particular embodiments and applications have been illustrated and described, it is to be understood that the described subject matter is not limited to the precise construction and components disclosed. The scope of protection should be limited only by the following claims.

The invention claimed is:

1. A computer-implemented method for providing location-based interactions in a parallel-reality application, the method comprising:
   receiving, from a client device, real-time location information and usage characteristics describing a user interacting with content in the parallel-reality application;
   accessing a ranked list of additional content items for the parallel-reality application to provide to users interacting with content in the parallel-reality application;
   determining, for each additional content item in the ranked list, a propensity score quantifying a degree of overlap between real-time location information and usage characteristics describing the user and assigned properties for the additional content item, the propensity score based on real-world location information, usage characteristics describing the user, and the assigned properties of the additional content item; and
   responsive to the determination, providing the additional content item with a highest propensity score to the client device for display in the parallel-reality application, wherein providing the additional content comprises:
      generating a static or dynamic object representing the additional content item with the highest propensity score; and
      providing the static or dynamic object for display to the user while the user interacts with content in the parallel-reality application.

2. The computer-implemented method of claim 1, wherein determining the propensity score further comprises:
   accessing an exchange value for an additional content item on the ranked list of additional content items; and
   determining the propensity score for the additional content item based on the exchange value, wherein the propensity score for the additional content item is proportional to the exchange value.

3. The computer-implemented method of claim 1, wherein determining the propensity score further comprises:
   accessing a preferred time to provide an additional content item from the ranked list to the client device;
   determining an actual time the user is interacting with content in the parallel-reality application based on the real-time location information; and
   determining the propensity score for the additional content item based on a comparison between the preferred time and the actual time, wherein the propensity score for the additional content item is inversely proportional to a difference between the actual time and the preferred time.

4. The computer-implemented method of claim 1, wherein determining the propensity score further comprises:
   determining a typical usage pattern for the user based on the usage characteristics information describing the user; and
   determining the propensity score for an additional content item on the ranked list based on the typical usage pattern, wherein the propensity score for the additional content item is proportional to a degree to which the additional content item corresponds to the typical usage pattern for the user.

5. The computer-implemented method of claim 1, wherein determining the propensity score further comprises:
   determining a real-world location of the user based on the real-time location information;
   accessing a preferred location for providing an additional content item of the ranked list to the client device; and
   determining the propensity score for the additional content item based on a comparison of the real-world location and the preferred location.

6. The computer-implemented method of claim 1, wherein determining the propensity score further comprises:
   determining real-world weather conditions around the user based on the real-time location information;
   accessing preferred weather conditions for an additional content item of the ranked list; and
   determining the propensity score for the additional content item based on a comparison of the real-world weather conditions and the preferred weather conditions, wherein the propensity score for the additional content item is proportional to a degree to which the preferred weather conditions and real-world weather conditions match.

7. The computer-implemented method of claim 1, wherein determining the propensity score further comprises:
  determining a method of travel for the user based on the real-time location information and usage characteristics;
  accessing a preferred method of travel for an additional content item of the ranked list; and
  determining the propensity score for the additional content item based on a comparison of the method of travel and the preferred method of travel, wherein the propensity score for the additional content item is proportional to a degree to which the preferred method of travel and method of travel match.

8. The computer-implemented method of claim 1, wherein determining the propensity score further comprises:
  determining a change in position of the user based on the real-time location information;
  accessing a location boundary for an additional content item of the ranked list; and
  determining the propensity score for the additional content item based on a comparison of the change in position of the user and the location boundary for the additional content item, wherein the propensity score proportionally corresponds to the change in position relative to the location boundary indicating the user is more likely to interact with the additional content item.

9. The computer-implemented method of claim 1, wherein determining the propensity score further comprises:
  determining real-time health characteristics of the user based on the usage characteristics;
  accessing preferred health characteristics for an additional content item of the ranked list; and
  determining the propensity score for the additional content item based on the preferred health characteristics and the real-time health characteristics, wherein the propensity score for the additional content item is proportional to a degree to which the preferred health characteristics and real-time health characteristics match.

10. The computer-implemented method of claim 1, wherein determining the propensity score further comprises:
  determining a real-time location of the user based on the real-time location information;
  accessing traffic conditions at the real-time location; and
  determining the propensity score for an additional content item in the ranked list based on the traffic conditions at the real-time location.

11. The computer-implemented method of claim 1, wherein determining the propensity score further comprises:
  determining a content type of the additional content item; and
  determining the propensity score of the additional content item based on the content type of the additional content item and the usage characteristics, wherein the propensity score represents a likelihood that the user will interact with additional content items having the interaction type.

12. The computer-implemented method of claim 1, wherein determining the propensity score further comprises:
  determining a navigation path for the user based on the real-time location information and the usage characteristics;
  determining a proximity between an additional content item of the ranked list and the navigation path; and
  determining the propensity score of the additional content item based on the proximity of the additional content item and the usage characteristics, wherein the propensity score represents a likelihood that the user will interact with additional content given the determined proximity.

13. The computer-implemented method of claim 1, wherein the parallel-reality application is a parallel-reality game and the static object is gameplay content in the parallel-reality game.

14. The computer-implemented method of claim 1, wherein the parallel-reality application is a parallel-reality game and the dynamic object is gameplay content in the parallel-reality game.

15. The computer-implemented method of claim 1, further comprising receiving an additional content items from a third-party client device for inclusion into the ranked list, and a position of the additional content items on the ranked list corresponds to an exchange value of the received additional content item relative to exchange values of other additional content items on the ranked list.

16. The computer-implemented of claim 1, wherein the received additional content item comprises various matching criteria, the matching criteria affecting the determination of the propensity score for the user.

17. A non-transitory computer readable storage medium storing executable computer program instructions for providing location-based interactions in a parallel-reality application, the computer program instructions, when executed by one or more processors, causing the one or more processors to:
  receive, from a client device, real-time location information and usage characteristics describing a user interacting with content in the parallel-reality application;
  access a ranked list of additional content items for the parallel-reality application to provide to users interacting with content in the parallel-reality application;
  determine, for each additional content item in the ranked list, a propensity score quantifying a degree of overlap between real-time location information and usage characteristics describing the user and assigned properties for the additional content item, the propensity score based on real-world location information, usage characteristics describing the user, and the assigned properties of the additional content item; and
  responsive to the determination, provide the additional content item with a highest propensity score to the client device for display in the parallel-reality application, wherein providing the additional content comprises:
    generating a static or dynamic object representing the additional content item with the highest propensity score; and
    providing the static or dynamic object for display to the user while the user interacts with content in the parallel-reality application.

18. The non-transitory computer readable storage medium of claim 17, wherein the received additional content item comprises various matching criteria, the matching criteria affecting the determination of the propensity score for the user.

* * * * *